Aug. 1, 1950     Y. M. HOAG     2,517,205
ANTIDRIP DEVICE
Filed Oct. 3, 1949

INVENTOR
YATES M. HOAG
BY Liverance and
Van Antwerp
ATTORNEYS

Patented Aug. 1, 1950

2,517,205

UNITED STATES PATENT OFFICE 2,517,205

ANTIDRIP DEVICE

Yates M. Hoag, Utica, N. Y.

Application October 3, 1949, Serial No. 119,358

4 Claims. (Cl. 296—44)

This invention relates to a novel device or attachment, which may be quickly and easily connected with the parts or sections of the windows at the front of the window openings normally at each side of an automobile body, at each end of the front or driving compartment of a motor vehicle, such windows normally being known as no-draft or ventilating windows, and which are mounted to turn, each about a vertical axis, the front portions of said no-draft windows being swung into the car and rear portions outwardly thereof.

When it rains and the no-draft or ventilating windows are thus positioned, water at the outside of the window glass moving toward the front and downwardly on the inwardly positioned portions of such ventilating windows, drips into the car. My invention is directed to a very practical, novel, simple and readily attached device which controls such water, which would normally drip into the car and directs it rearwardly so that it falls or drips outside of the car. It is an object and purpose of the present invention to provide such novel and relatively simple device which can be attached, in one size or model thereof, to many different sizes and shapes of the no-draft or ventilating windows, the material from which the device is made, in the main being of a rubber material sufficiently elastic and resilient that it will stretch to conform to the different sizes and dimensions of such windows that are used.

An understanding of the invention may be had from the following description, taken in connection with the accompanying drawing, in which, Fig. 1 is an elevation of a no-draft or ventilating window with the device of my invention attached thereto.

Like reference characters refer to like parts in the different figures of the drawing.

The structure comprises, in the main, two angularly disposed arms or lengths of a relatively live rubber preferably, one of the arms of said lengths 1 in use being disposed vertically. At its rear edge between its ends and for the major portion of its length it has a trough 2 therein between inner and outer lips 3 and 4.

Figure 3:
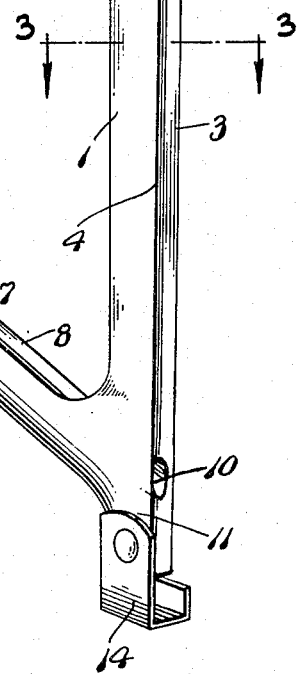
Fig. 3 is a horizontal section substantially on the plane of line 3—3 of Fig. 2 in the normal form thereof.
Figure 3:
Figure 4:
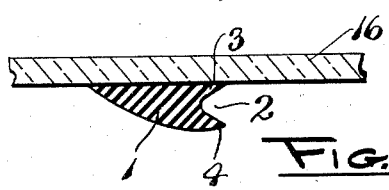
Fig. 4 is a similar section therethrough when pressed against the outer side of the glass of the ventilating window.

The form of the cross section of the arm 1, when not in use, is as shown in Fig. 3, the inner lip 3 being disposed at an obtuse angle to and extending inwardly from the adjacent body portion of the arm 1. Said vertical arm or length 1 at its upper end is flattened and reduced in thickness to provide a short terminal upper section 5 as shown.

The second arm or length 6 is located at an acute angle to the length of the vertical arm 1 and in use extends upwardly and forwardly therefrom. It is integral with the lower end portion of the arm 1 and at its upper side has a trough 7 with inner and outer spaced lips 8 and 9, such trough 7 and the lips 8 and 9 being substantially the same as the trough 2 and the lips 3 and 4 on the first described arm 1. The trough 7 at its lower end leads to and communicates with an outlet passage 10 which is made through the integral juncture of the two arms 1 and 6, near the lower end of said arm 1. Such arm 1, below said outlet opening 10, is also formed with a short length of narrow thickness on a section 11 similar to section 5 at the upper end. Similarly the front or free end of the arm 6 has a like section 12 beyond the upper end of the trough 7.

Figure 2:
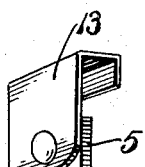
Fig. 2 is a somewhat enlarged perspective view of the device of my invention unattached.

On the sections 5, 11 and 12, clips 13, 14 and 15, respectively, of sheet metal and of a hook form, best shown in Fig. 2, are secured by rivets or other equivalent fastenings passing through the shanks of the hooks. The clip hooks extend beyond the ends of the sections 5, 11 and 12.

Figure 1:
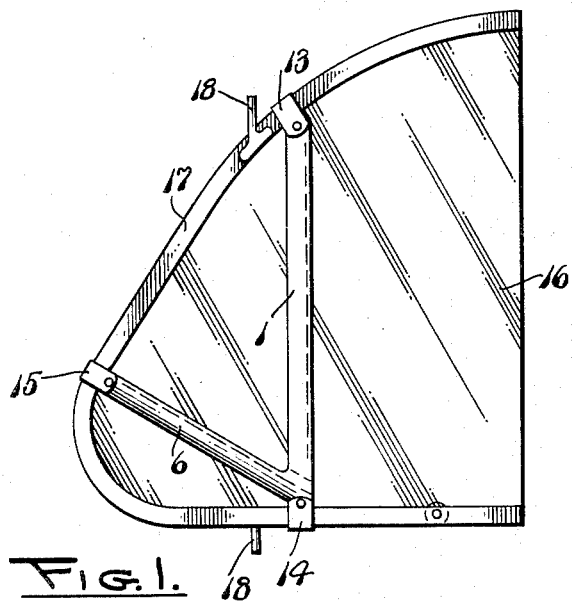

This device as described may be attached to a front no-draft or ventilating window which have a glass body 6 provided with a frame 17 of metal as shown in Fig. 1. Such window is mounted on the front door to turn about the axes of vertical pintles 18 which have a pivotal bearing at the front of the upper portion of an automobile front door, ahead of the normally vertical movable slidable glass window also carried by the door. The clips 13 and 14 at the upper and lower ends of the vertical arm 1 engage the frame 17 a short distance back of the pivot pins 18. The clip 15 is hooked over the border frame 17 usually slightly above the curved lower forward portion thereof as shown in Fig. 1; The clips, when attached to the border frame in this manner, cause the inner lips 3 and 8 of the two arms 1 and 6 to be pressed against the outer side of the glass 16, thus deforming them from normal positions, as in Fig. 3, so that the inner sides of the lips 3 and 8 are in the vertical plane of the outer side of the glass and the arms.

It will be understood that with the ventilating no-draft window in an open position, that part of the window back of the common vertical axis of the pins 18 is swung outwardly from the automobile body. Water from rain coming against the outer side of the window back of the vertical arm 1 cannot pass such arm but instead will be carried to the trough 2 and, by gravity, run down to the lower end thereof and drip back of the lower pin 18 and, therefore, outside of the car. Water from rain in front of the vertical arm 1 and above the lower arm 6 will be delivered in the trough 7 at the upper side of the arm 6 and, by gravity, go downwardly and to the rear through the outlet opening at 10, and drip outside of the car at the same place as any water from the trough 2. Therefore, during a rain, water which would normally flow down the front portion of the glass 16 at the outer side and drip from the lower side thereof in front of the lower pin 18, and thus into the car, is prevented from entering the car and is directed to outside of the car.

The device is attached by merely hooking the clip hooks 13, 14 and 15 over the front portion of the ventilating or no-draft window. Variations in the different sizes and shapes of such window are readily taken care of by the elasticity and, therefore, stretchability of the arms 1 and 6, and such elasticity aids in maintaining the inside lips 3 and 8 of the respective arms 1 and 6 in a snug, bearing relationship against the outer side of the glass 16.

The invention is defined in the appended claims and is to be considered comprehensive of all forms of structure coming within their scope.

I claim:

1. A structure as described comprising, an elongated arm normally adapted to be located vertically, and provided with a trough at its rear edge, having an inner lip at the inner side of the trough which terminates in a sharp edge and an outer lip, a second arm integral with the first arm adjacent the lower end thereof and adapted to extend forwardly and upwardly therefrom, having at its upper side a trough with an inner lip and an outer lip substantially the same as those on the first arm, said trough in the second arm having an outlet opening associated therewith passing through the juncture of said arms, and attaching means one at each the upper and lower ends of the first arm and at the outer free end of the second arm, adapting said device to be secured at the outer side and front portion of a motor vehicle no-draft or ventilating window.

2. A structure as defined in claim 1, said arms being of an elastic and resilient material, whereby they may be elongated by stretching for attachment to no-draft or ventilating windows of different shapes and dimensions.

3. A structure as defined in claim 1, said inner lips to said troughs on said arms normally extending at an obtuse angle to the inner sides of said arms, and adapted when applied to a no-draft window to be pressed outwardly so that the inner sides of the lips are in the same planes as the inner sides of said arms, thereby providing a sealing bearing of said lips against the outer side of a window to which applied.

4. A structure as defined in claim 1, said vertical arm at its upper and lower ends, and said second arm at its outer forward free ends each having relatively short and narrow width integral sections, and said attaching means, each comprising a hook of flat metal, the shanks of said hooks being permanently secured to said sections and said hooks extending beyond the outer ends of said narrow width sections.

YATES M. HOAG.

REFERENCES CITED

The following references are of record in the file of this patent:

UNITED STATES PATENTS

| Number | Name | Date |
|---|---|---|
| 2,263,860 | Schell | Nov. 25, 1941 |
| 2,354,443 | Schirra | July 25, 1944 |
| 2,478,161 | Russell | Aug. 2, 1949 |
| 2,500,991 | Kent | Mar. 21, 1950 |